US012389166B2

(12) United States Patent
Lin et al.

(10) Patent No.: US 12,389,166 B2
(45) Date of Patent: Aug. 12, 2025

(54) SENSOR BASED EAR-WORN ELECTRONIC DEVICE FIT ASSESSMENT

(71) Applicant: STARKEY LABORATORIES, INC., Eden Prairie, MN (US)

(72) Inventors: Andy S. Lin, Eden Prairie, MN (US); Peter Flanagan, Eden Prairie, MN (US); Kyle Olson, Eden Prairie, MN (US); Fa Wang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 306 days.

(21) Appl. No.: 18/018,610

(22) PCT Filed: Jul. 19, 2021

(86) PCT No.: PCT/US2021/042154
§ 371 (c)(1),
(2) Date: Jan. 30, 2023

(87) PCT Pub. No.: WO2022/026231
PCT Pub. Date: Feb. 3, 2022

(65) Prior Publication Data

US 2023/0300542 A1 Sep. 21, 2023

Related U.S. Application Data

(60) Provisional application No. 63/059,587, filed on Jul. 31, 2020.

(51) Int. Cl.
*H04R 25/00* (2006.01)

(52) U.S. Cl.
CPC .................................. *H04R 25/305* (2013.01)

(58) Field of Classification Search
CPC ...... H04R 25/00; H04R 25/30; H04R 25/305; H04R 25/353
See application file for complete search history.

(56) References Cited

U.S. PATENT DOCUMENTS 5,469,855 A 11/1995 Pompei
6,556,852 B1 4/2003 Schulze
(Continued)

FOREIGN PATENT DOCUMENTS

JP 411150797 A 6/1999
WO WO 2012167234 A1 12/2012

OTHER PUBLICATIONS

Internation Patent Application No. PCT/US2021/042154, filed Jul. 19, 2021; International Search Report / Written Opinion issued Nov. 2, 2021; 10 pages.
(Continued)

*Primary Examiner* — Suhan Ni
(74) *Attorney, Agent, or Firm* — Mueting Raasch Group

(57) ABSTRACT

An ear-worn electronic device comprises a housing configured for deployment in, on or about an ear of a wearer and a power source situated in the housing. A sensor is situated in or on the housing and coupled to the power source. The sensor is configured to generate a sensor signal representative of motion of the wearer's head and relative motion between the sensor and skin of the wearer's ear resulting from the wearer's head motion. A controller is situated in the housing and coupled to the power source and the sensor. The controller is configured to assess a fit of the device using the sensor signal.

20 Claims, 8 Drawing Sheets

(56) References Cited

U.S. PATENT DOCUMENTS

| | | | | |
|---|---|---|---|---|
| 7,660,426 | B2 | 2/2010 | Hannibal | |
| 9,288,584 | B2 | 3/2016 | Hansen | |
| 9,439,009 | B2 | 9/2016 | Kim | |
| 9,635,469 | B2 | 4/2017 | Lunner | |
| 9,723,415 | B2 | 8/2017 | Gran | |
| 10,455,337 | B2 | 10/2019 | Yoo | |
| 2005/0123146 | A1 | 6/2005 | Voix | |
| 2011/0044483 | A1 | 2/2011 | Edgar | |
| 2011/0058681 | A1 | 3/2011 | Naylor | |
| 2016/0373869 | A1 | 12/2016 | Gran | |
| 2017/0094389 | A1* | 3/2017 | Saulsbury | A61B 5/6817 |
| 2017/0280253 | A1* | 9/2017 | Oplinger | H04R 25/407 |

OTHER PUBLICATIONS

International Patent Application No. PCT/US2021/042154, filed Jul. 19, 2021; International Preliminary Report on Patentability issued Jan. 31, 2023; 8 pages.

* cited by examiner

*Figure 7*
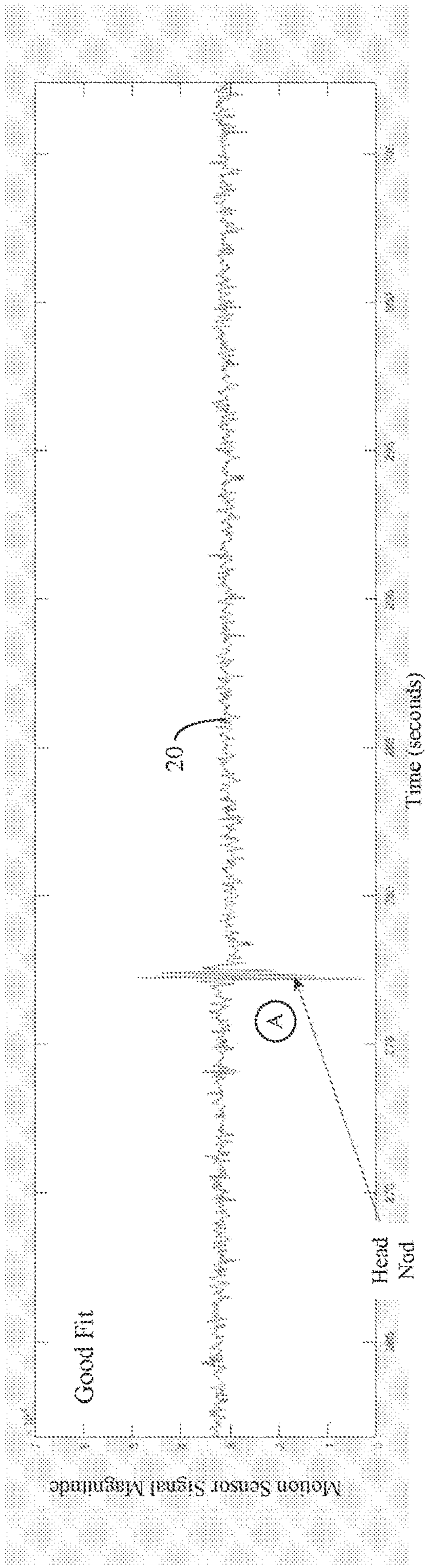
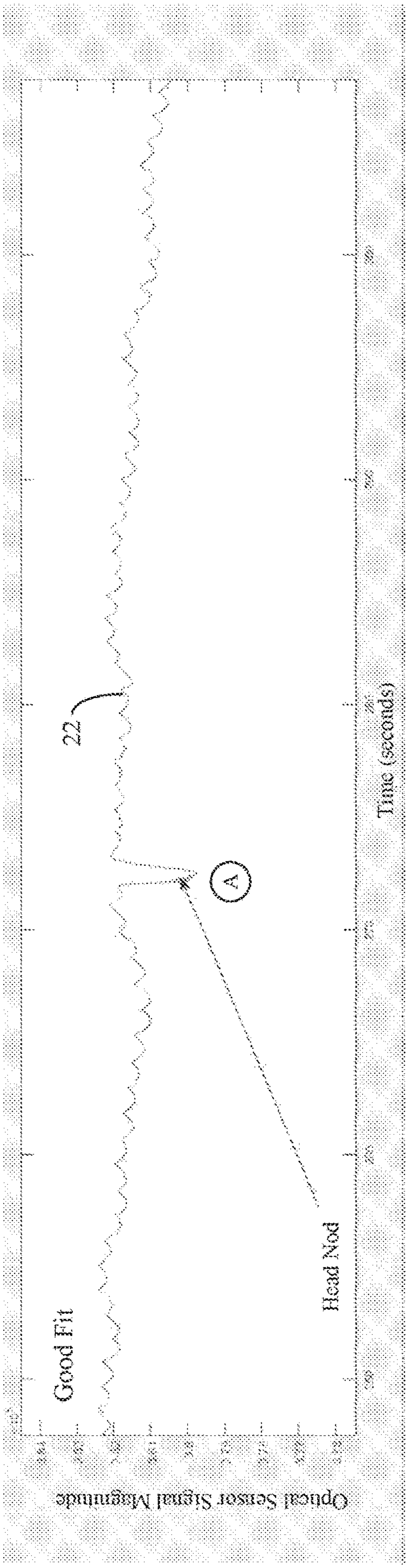
*Figure 8*

SENSOR BASED EAR-WORN ELECTRONIC DEVICE FIT ASSESSMENT

RELATED APPLICATIONS

This application is the § 371 U.S. National Stage of International Application No. PCT/US2021/042154, filed Jul. 19, 2021, which claims the benefit of U.S. Provisional Application No. 63/059,587, filed Jul. 31, 2020, the entire content of both are hereby incorporated by reference.

TECHNICAL FIELD

This application relates generally to ear-level electronic systems and devices, including hearing devices, personal amplification devices, hearing aids, hearables, physiologic monitoring devices, biometric devices, position and/or motion sensing devices, and other ear-worn electronic devices.

SUMMARY

Embodiments are directed to an ear-worn electronic device comprising a housing configured for deployment in, on or about an ear of a wearer. A power source is situated in the housing. A sensor is situated in or on the housing and coupled to the power source. The sensor is configured to generate a sensor signal representative of motion of the wearer's head and relative motion between the sensor and skin of the wearer's ear resulting from the wearer's head motion. A controller is situated in the housing and coupled to the power source and the sensor. The controller is configured to assess a fit of the device using the sensor signal.

Embodiments are directed to a system comprising an ear-worn electronic device and an external electronic device configured to communicatively couple to the ear-worn electronic device. The ear-worn electronic device comprises a housing configured for deployment in, on or about an ear of a wearer, a power source situated in the housing, and a sensor situated in or on the housing and coupled to the power source. The sensor is configured to generate a sensor signal representative of motion of the wearer's head and relative motion between the sensor and skin of the wearer's ear resulting from the wearer's head motion. A first controller is situated in the housing and coupled to the power source and the sensor. The external electronic device is configured to communicatively couple to the ear-worn electronic device and receive the sensor signal from the ear-worn electronic device. The external electronic device comprises a second controller configured to assess a fit of the ear-worn electronic device using the received sensor signal.

Embodiments are directed to a method implemented by an ear-worn electronic device configured for deployment in, on or about an ear of a wearer. The method comprises generating, using a sensor of the device, a sensor signal representative of motion of the wearer's head and relative motion between the sensor and skin of the wearer's ear resulting from the wearer's head motion. The method also comprises assessing, by a controller, a fit of the device using the sensor signal. The method further comprises generating, by the controller, information about the fit of the device in response to assessing the device fit.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 7 is a zoomed-in view of the sensor signal shown in FIG. 5;

FIG. 8 is a zoomed-in view of the sensor signal shown in FIG. 6;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
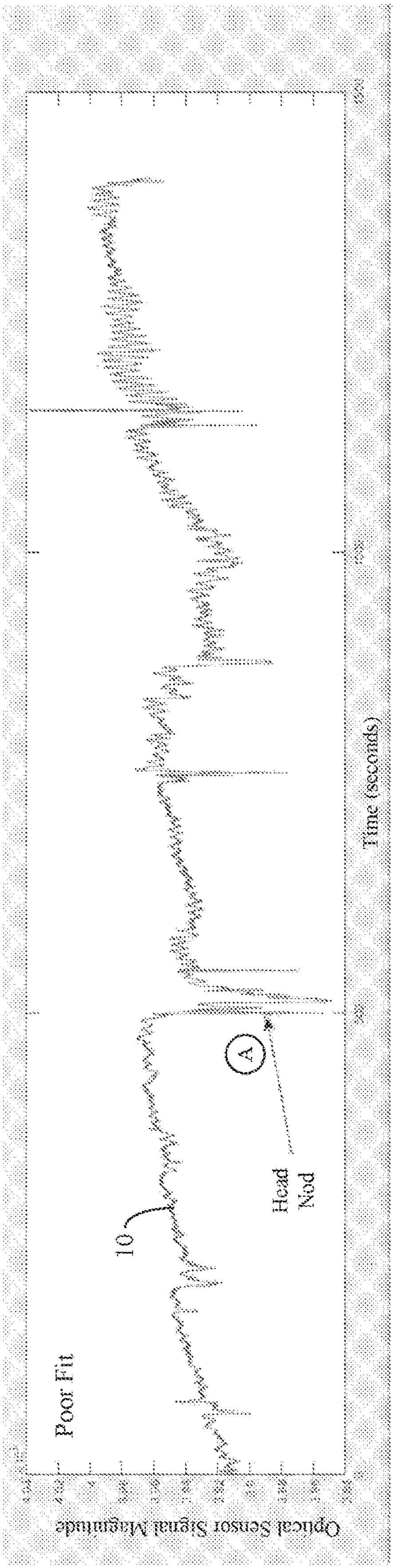
FIG. 1 shows a sensor signal generated by an optical sensor of an ear-worn electronic device according to the present disclosure during a fit assessment, the sensor signal indicating a poor fit of the device.

Embodiments of the disclosure are directed to an ear-worn electronic device configured to implement an objective device fit evaluation. The fit for any in-ear device is essential for many reasons, such as comfort of the wearer, sound quality, and accuracy of biometric measurements, among others. For example, and in the context of a hearing aid, parameters of various signal processing algorithms are typically determined during an initial fitting session in an audiologist's office and programmed into the hearing aid by activating desired algorithms and setting algorithm parameters in a non-volatile memory of the hearing aid. Generally, the audiologist spends relatively little time on physically fitting the hearing aid to the wearer in comparison to the time required to properly program the hearing aid to properly compensate for the wearer's hearing loss. Moreover, the quality of the fit can be difficult to assess even for trained specialists. Relying on subjective feedback from the wearer to self-assess the fit is inherently problematic and unreliable.

In the context of consumer hearables, such as earbuds, different sizes and styles of tips and anchoring wings are often provided. However, it takes some guesswork and experimentation with different combinations of tips and/or anchoring wings to find a potentially good match for a particular wearer's ears. A poorly fitted device can ruin the user experience. An ear-worn electronic device (e.g., a consumer earbud) which has a poor fit can be described as a device which is not securely situated in the desired location and which undesirably displaces under influence of motion.

Embodiments of the present disclosure are directed to ear-worn electronic devices and methods implemented by such devices for performing a quick (e.g., within a couple of minutes, such as about 1 or 2 minutes), unbiased fit assessment. A fit assessment in accordance with any of the embodiments disclosed herein can be implemented by the wearer of the ear-worn electronic device and without the assistance or presence of a trained specialist. For example, the wearer of an ear-worn electronic device can perform some basic head motion, such as a head nod or shake, and the displacement of the device in response to this movement can be detected by the device in a number of different ways, representative examples of which are described hereinbelow.

An ear-worn electronic device can include a sensor configured to generate a sensor signal representative of motion of the wearer's head and relative motion between the sensor and skin of the wearer's ear resulting from the wearer's head motion. A controller of the ear-worn electronic device can be configured to assess the fit of the device using the sensor signal. In some implementations, a controller of an external device communicatively coupled to the ear-worn electronic device can be configured to assess a fit of the device using the sensor signal. The controller of the ear-worn electronic device and/or the external device can be configured to generate information about the fit of the device in response to the device fit assessment. Device fit information can be communicated to the wearer, such as by an audio output device of the ear-worn electronic device and/or a display/speaker of an external device.

By way of example, if the ear-worn electronic device is loose during a predetermined motion of the wearer's head, in addition to detecting the large predetermined head motion, the sensor of the device may also detect some change in the sensor signal indicative of device rattling within the ear due to the loose fit after the predetermined head motion is completed. Evaluation of the sensor signal by a controller of the ear-worn electronic device or an external device can determine whether the fit of the device is a proper fit or an improper fit. The outcome of this device fit evaluation can be communicated to the wearer. If an improper fit is detected, the wearer can adjust the fit of the device and the device fit assessment can be repeated.

According to any of the embodiments disclosed herein, an ear-worn electronic device can incorporate a motion sensor, such as a multi-axis motion sensor or other motion sensor disclosed herein. During a device fit assessment, in addition to detecting the large predetermined head motion, the controller can be configured to detect a baseline change in the motion sensor signal as the device rattles in the ear due to a loose fit after the predetermined head motion is completed. For example, the controller can be configured to detect a fast change in an acceleration signal due to the device rattling. The controller can be configured to detect a change in the acceleration signal measured on different axes due to slight device displacement. This motion and displacement are often small and difficult to see with the naked eye, but are very noticeable when measuring and processing the motion sensor signal.

According to any of the embodiments disclosed herein, an ear-worn electronic device can incorporate an optical sensor, representative examples of which are disclosed herein. If the device is loose during performance of the predetermined head motion, the controller can detect a fast signal change, such as the signal amplitude which is often larger than the normal AC signal modulation of the received optical signal due to device rattling. In this representative embodiment, the controller can also detect an additional change in DC baseline level of the optical signal that indicates the position of the device is shifted (e.g., the same phenomena as described above with reference to the motion sensor).

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-worn electronic device comprises a housing configured for deployment in, on or about an ear of a wearer, a power source situated in the housing, a sensor situated in or on the housing and coupled to the power source, the sensor configured to generate a sensor signal representative of motion of the wearer's head and relative motion between the sensor and skin of the wearer's ear resulting from the wearer's head motion, and a controller situated in the housing and coupled to the power source and the sensor, the controller configured to assess a fit of the device using the sensor signal.

Example Ex2. The device according to Ex1, wherein the controller is configured to assess the fit of the device using the sensor signal generated after execution of the wearer's head motion.

Example Ex3. The device according to Ex1, wherein the controller is configured to assess the fit of the device using the sensor signal generated during and after execution of the wearer's head motion.

Example Ex4. The device according to Ex1, wherein the controller is configured to detect execution of the wearer's head motion using a first portion of the sensor signal and, in response to detecting execution of the wearer's head motion, assess the fit of the device using a second portion of the sensor signal representative of relative motion between the sensor and skin of the wearer's ear resulting from execution of the wearer's head motion.

Example Ex5. The device according to Ex1, wherein the controller is configured to detect whether the fit of the device is a proper fit or an improper fit using the sensor signal.

Example Ex6. The device according to Ex1, wherein the controller is configured to detect an artifact in the sensor signal during or following execution of the wearer's head motion, and assess the fit of the device using the artifact.

Example Ex7. The device according to Ex1, wherein the controller is configured to detect the presence or absence of an artifact in the sensor signal during or following execution of the wearer's head motion, and assess the fit of the device in response to detecting the presence or absence of the artifact.

Example Ex8. The device according to Ex1, wherein the controller is configured to detect the presence or absence of an artifact in the sensor signal during or following execution of the wearer's head motion, detect a proper fit of the device in response to detecting the absence of the artifact, and detect an improper fit of the device in response to detecting the presence of the artifact.

Example Ex9. The device according to Ex1, wherein the controller is configured to detect an artifact in the sensor signal during or following execution of the wearer's head motion, measure a feature of the artifact, and assess the fit of the device using the measure of the artifact feature.

Example Ex10. The device according to any of Ex6 through Ex9, wherein the artifact comprises noise.

Example Ex11. The device according to any of Ex6 through Ex9, wherein the artifact comprises high frequency noise.

Example Ex12. The device according to Ex11, wherein a frequency of the high frequency noise is higher than a frequency associated with any motion of the wearer's head.

Example Ex13. The device according to any of Ex6 through Ex9, wherein the artifact comprises a change in a signal-to-noise ratio (SNR) of the sensor signal.

Example Ex14. The device according to any of Ex6 through Ex9, wherein the artifact comprises ringing in the sensor signal.

Example Ex15. The device according to any of Ex6 through Ex9, wherein the artifact comprises a change in morphology of the sensor signal.

Example Ex16. The device according to any of Ex6 through Ex9, wherein the artifact comprises a shift in a baseline measurement of the sensor signal.

Example Ex17. The device according to Ex16, wherein the measured baseline feature comprises a DC baseline level of the sensor signal.

Example Ex18. The device according to any of Ex6 through Ex9, wherein the sensor comprises a PPG sensor and the controller is configured to calculate a perfusion index (PI) measured by the PPG sensor, measure a shift of the PI prior to and after execution of the wearer's head motion, and assess the fit of the device using the measured shift of the PI.

Example Ex19. The device according to one or more of Ex1 to Ex18, wherein the controller is configured to measure a baseline feature of the sensor signal prior to and after execution of the wearer's head motion, and assess the fit of the device using a change in the measured baseline feature.

Example Ex20. The device according to one or more of Ex1 to Ex19, wherein the controller is configured to measure a baseline feature of the sensor signal prior to and after execution of the wearer's head motion, and assess the fit of the device using a rate of change in the measured baseline feature.

Example Ex21. The device according to one or more of Ex1 to Ex20, wherein the controller is configured to measure a baseline feature of the sensor signal prior to and after execution of the wearer's head motion, and assess the fit of the device using a change in magnitude of the measured baseline feature.

Example Ex22. The device according to one or more of Ex1 to Ex21, wherein the controller is configured to measure a baseline feature of the sensor signal prior to and after execution of the wearer's head motion, and assess the fit of the device using a rate of change in the measured baseline feature and a change in magnitude of the measured baseline feature.

Example Ex23. The device according to one or more of Ex1 to Ex22, wherein the sensor is a motion sensor.

Example Ex24. The device according to one or more of Ex1 to Ex23, wherein the sensor comprises one or any combination of an accelerometer, a gyroscope, a magnetometer, and an inertial measurement unit.

Example Ex25. The device according to one or more of Ex1 to Ex24, wherein the sensor is an optical sensor.

Example Ex26. The device according to one or more of Ex1 to Ex25, wherein the sensor comprises a photoplethysmogram (PPG) sensor.

Example Ex27. The device according to one or more of Ex1 to Ex26, wherein the sensor is configured to contact the skin of the wearer's ear and sense a change in an electrical property of the skin.

Example Ex28. The device according to Ex27, wherein the sensor is configured to sense one or any combination of impedance, conductance, resistance, and electrodermal activity.

Example Ex29. The device according to one or more of Ex1 to Ex28, wherein the controller is configured to generate an output indicating a result of the fit assessment.

Example Ex30. The device according to Ex29, wherein the device comprises an audio processing facility, and the output comprises an audible output communicated to an ear drum of the wearer's ear via the audio processing facility.

Example Ex31. The device according to Ex29, wherein the output comprises a signal, and the device comprise a wireless communication device configured to transmit the signal to an external device or system.

Example Ex32. A system comprises an ear-worn electronic device comprising a housing configured for deployment in, on or about an ear of a wearer, a power source situated in the housing, a sensor situated in or on the housing and coupled to the power source, the sensor configured to generate a sensor signal representative of motion of the wearer's head and relative motion between the sensor and skin of the wearer's ear resulting from the wearer's head motion, and a first controller situated in the housing and coupled to the power source and the sensor. An external electronic device is configured to communicatively couple to the ear-worn electronic device and receive the sensor signal from the ear-worn electronic device, the external electronic device comprising a second controller configured to assess a fit of the ear-worn electronic device using the received sensor signal.

Example Ex33. The system according to Ex32, wherein the external electronic device comprises a smartphone, a tablet, a laptop, or a desktop computer.

Example Ex34. The system according to Ex32 or Ex33, wherein the second controller is configured to implement processes of the controller recited in one or more of Ex2 to Ex22 and Ex29 to Ex31.

Example Ex35. The system according to one or more of Ex32 to Ex34, wherein the sensor is configured as recited in one or more of Ex23 to Ex28.

Example Ex36. A method implemented by an ear-worn electronic device configured for deployment in, on or about an ear of a wearer comprises generating, using a sensor of the device, a sensor signal representative of motion of the wearer's head and relative motion between the sensor and skin of the wearer's ear resulting from the wearer's head motion, assessing, by a controller, a fit of the device using the sensor signal, and generating, by the controller, information about the fit of the device in response to assessing the device fit.

Example Ex37. The method according to Ex36, wherein the controller is configured to implement any one or any combination of processes recited in Ex2 to Ex22 and Ex29 to Ex31.

Example Ex38. The method according to Ex36, wherein the sensor is configured as recited in any one or more of Ex23 to Ex28.

Example Ex39. The method according to one or more of Ex36 to Ex38, wherein the controller comprises a controller of the ear-worn electronic device.

Example Ex40. The method according to one or more of Ex36 to Ex38, wherein the controller comprises a controller of an external electronic device configured to communicatively couple to the ear-worn electronic device.

Figure 2:
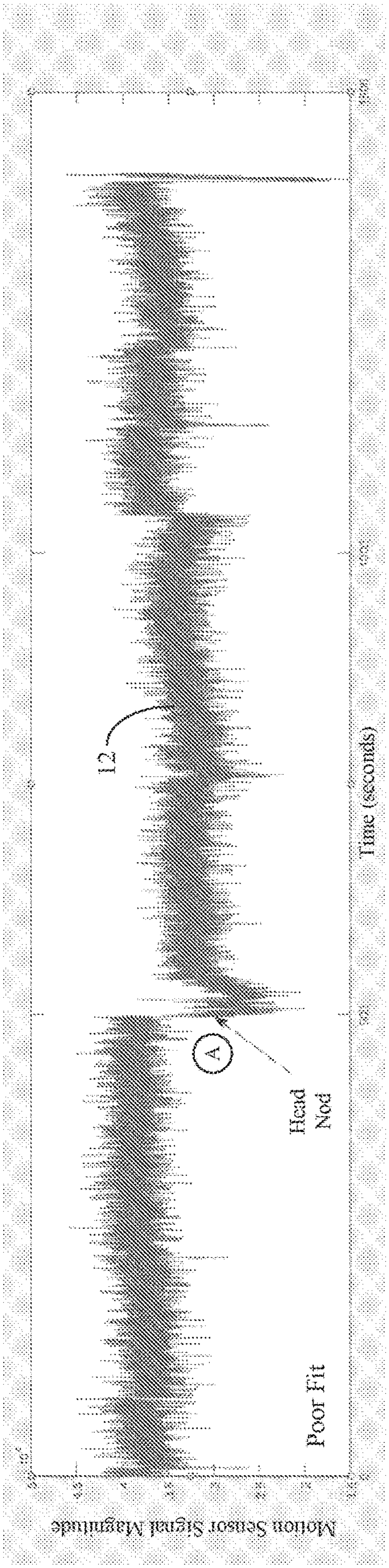
FIG. 2 shows a sensor signal generated by a motion sensor of an ear-worn electronic device according to the present disclosure during a fit assessment, the sensor signal indicating a poor fit of the device.

FIG. 1 shows a sensor signal 10 generated by an optical sensor (e.g., a photoplethysmogram (PPG) sensor) of an ear-worn electronic device during a fit assessment involving predetermined motion of the wearer's head. FIG. 2 shows a sensor signal 12 generated by a motion sensor (e.g., an inertial measurement unit or IMU) of an ear-worn electronic device during a fit assessment involving predetermined motion of the wearer's head. The sensor signals 10, 12 shown in FIGS. 1 and 2 are examples of sensor signals manifested during a head nod motion occurring at time A and are indicative of a poorly fitted in-ear device. More details of sensor signals 10, 12 can be seen in FIGS. 3 and 4, which are zoomed-in views of the sensor signals 10, 12 shown in FIGS. 1 and 2 during the head nod event at time A.

Figure 3:
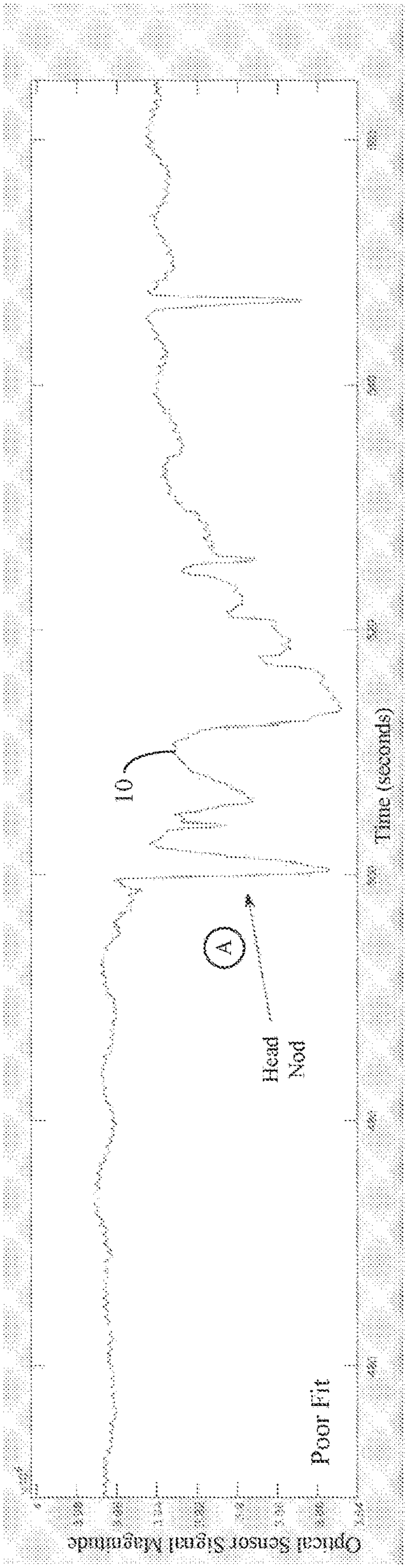
FIG. 3 is a zoomed-in view of the sensor signal shown in FIG. 1.
Figure 4:
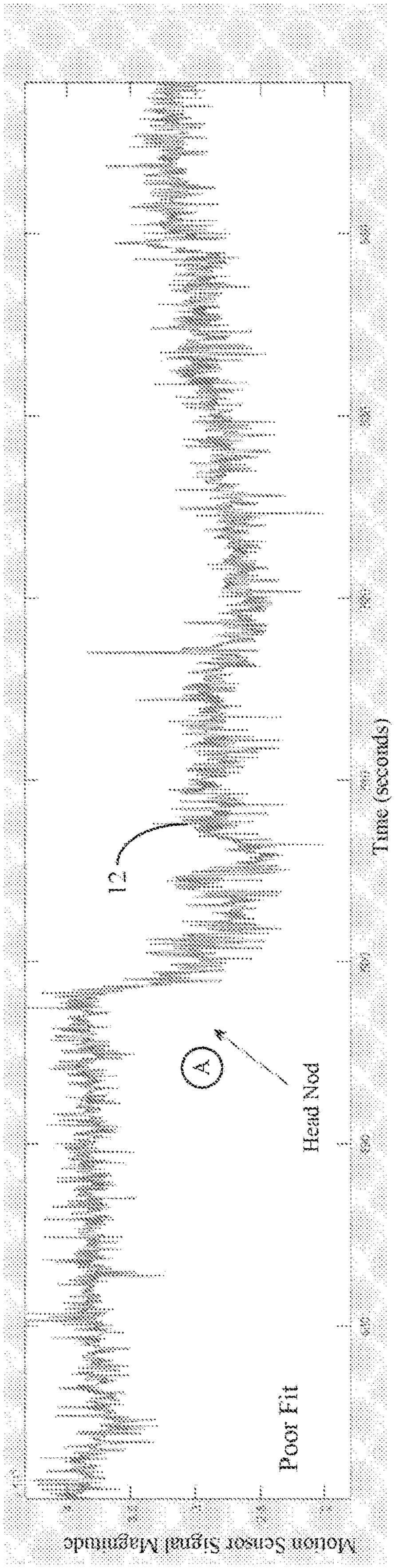
FIG. 4 is a zoomed-in view of the sensor signal shown in FIG. 2.

As can be seen in FIGS. 1 and 3, the optical sensor signal 10 evidences a relatively slow shift of the optical signal baseline due to the large predetermined head gesture and an amplitude change which is larger than the normal AC signal modulation due to device rattling. In addition, the optical sensor signal 10 evidences an additional change in the DC baseline level, which indicates that the position of the device within the ear has shifted due to the poor fit. As can be seen in FIGS. 2 and 4, the motion sensor signal 12 evidences a relatively slow time-varying amplitude change indicative of the large predetermined head motion and, in addition, a quick amplitude change in the motion sensor signal 12 indicative of device rattling.

Figure 5:
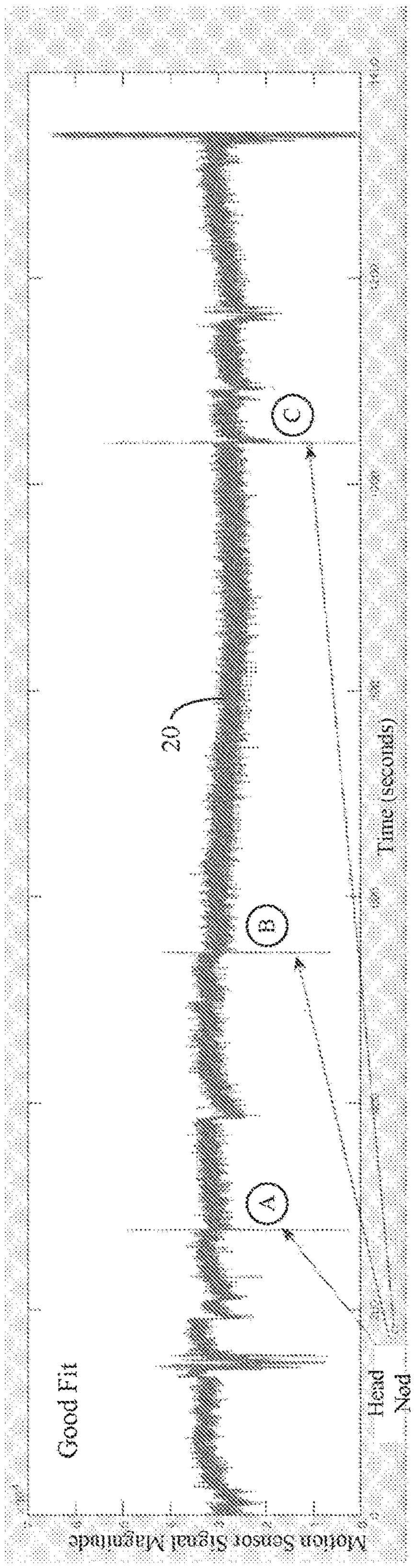
FIG. 5 shows a sensor signal generated by a motion sensor of an ear-worn electronic device according to the present disclosure during a fit assessment, the sensor signal indicating a good fit of the device.
Figure 6:
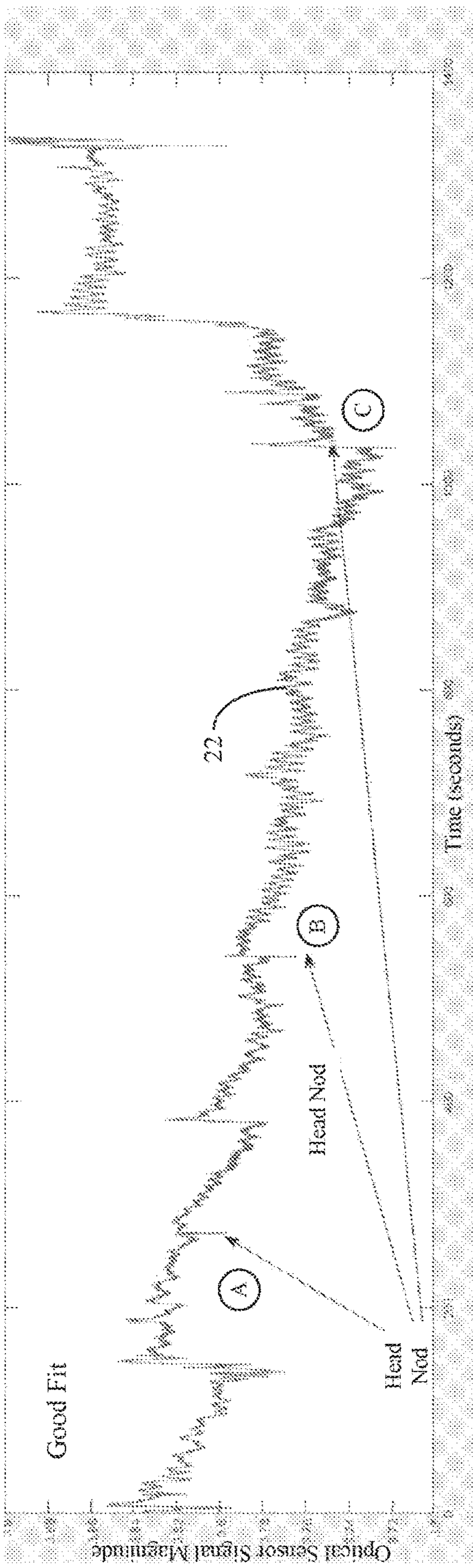
FIG. 6 shows a sensor signal generated by an optical sensor of an ear-worn electronic device according to the present disclosure during a fit assessment, the sensor signal indicating a good fit of the device.

FIGS. 5-8 show sensor signals generated by a sensor of an ear-worn electronic device indicative of a good fit. FIGS. 5 and 7 show a sensor signal 20 generated by the motion sensor of the ear-worn electronic device, with head nod events occurring at times A, B, and C. FIG. 7 shows a zoomed-in view of the motion sensor signal 20 during the head nod event at time A. FIGS. 6 and 8 show a sensor signal 22 generated by the optical sensor of the ear-worn electronic device, with head nod events occurring at times A, B, and C. FIG. 8 is a zoomed-in view of the optical sensor signal 22 during the head nod event at time A.

In the case of a good fit using an ear-worn electronic device equipped with a motion sensor, the motion sensor signal 20 evidences a quick impulse in acceleration due to the large predetermined head motion and an absence of a quick change in acceleration indicative of device rattling. In the case of a good fit using an ear-worn electronic device equipped with an optical sensor, the optical sensor signal 22 evidences a mild or slow shift of the optical signal baseline due to the large predetermined head motion, a quick shift of the optical signal baseline due to a head nod event, and a return of the baseline signal to its original state thereafter.

Figure 9:
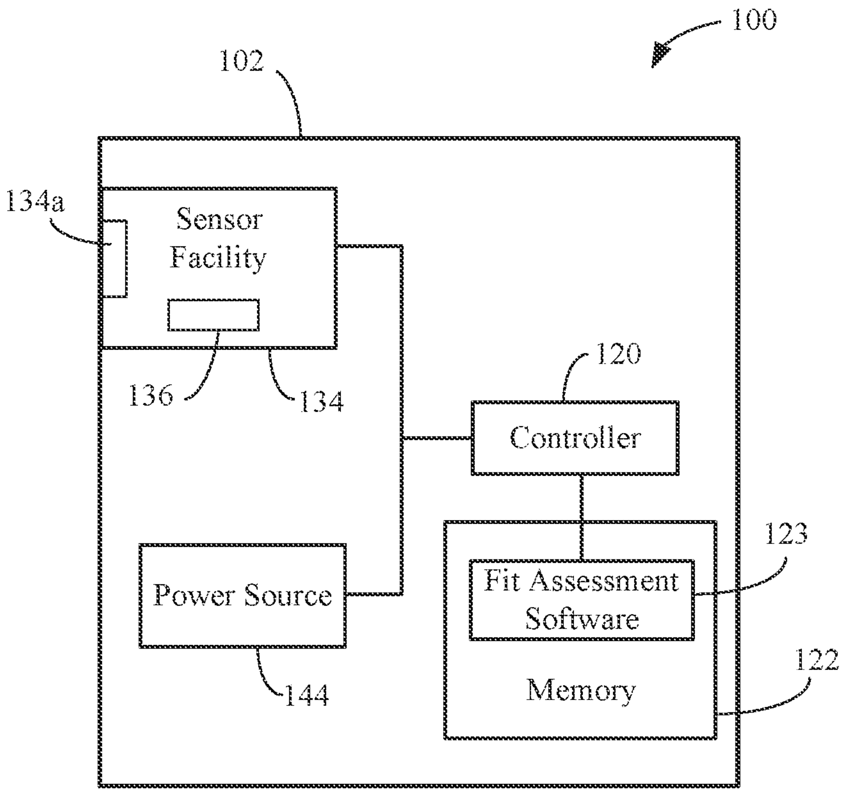
FIG. 9 is a block diagram of an ear-worn electronic device configured to implement a sensor-based device fit assessment in accordance with any of the embodiments disclosed herein

FIG. 9 is a block diagram of an ear-worn electronic device 100 configured to implement a sensor-based device fit assessment in accordance with any of the embodiments disclosed herein. The device 100 is representative of a wide variety of electronic devices configured to be deployed in, on or about an ear of a wearer. In some implementations, the device 100 can be deployed in, on or about one ear of the wearer (e.g., left or right ear). In other implementations, a first device 100 can be deployed in, on or about the wearer's left ear, and a second device 100 can be deployed in, on or about the wearer's right ear. The first and second devices 100 can operate cooperatively (e.g., via an inductive or radio frequency ear-to-ear link) or independently. In some implementations, the sensor or sensors used to assess device fit can be incorporated in only one of two devices 100 or in each of the devices 100. In other implementations, the controller that operates on sensor signals can be incorporated in only one of two devices 100 or in each of the devices 100. In further implementations, the controller that operates on sensor signals can be incorporated in an external electronic device, such as a smartphone, tablet, laptop or desktop computer.

The term ear-worn electronic device (e.g., device 100) refers to a wide variety of electronic devices configured for deployment in, on or about an ear of a wearer. Representative ear-worn electronic devices of the present disclosure include, but are not limited to, in-the-canal (ITC), completely-in-the-canal (CIC), invisible-in-canal (IIC), in-the-ear (ITE), receiver-in-canal (RIC), behind-the-ear (BTE), and receiver-in-the-ear (RITE) type devices. Representative ear-worn electronic devices of the present disclosure include, but are not limited to, earbuds, electronic ear plugs, and other ear-worn electronic appliances. Ear-worn electronic devices of the present disclosure include various types of hearing devices, various types of physiologic monitoring and biometric devices, and combined hearing/physiologic monitoring devices. Ear-worn electronic devices of the present disclosure include restricted medical devices (e.g., devices regulated by the U.S. Food and Drug Administration), such as hearing aids. Ear-worn electronic devices of the present disclosure include consumer electronic devices, such as consumer earbuds, consumer sound amplifiers, and consumer hearing devices (e.g., consumer hearing aids and over-the-counter (OTC) hearing devices), for example.

The ear-worn electronic device 100 shown in FIG. 9 includes a housing 102 configured for deployment in, on or about an ear of a wearer. According to any of the embodiments disclosed herein, the housing 102 can be configured for deployment at least partially within the wearer's ear. For example, the housing 102 can be configured for deployment at least partially or entirely within an ear canal of the wearer's ear. The housing 102 can be configured for deployment at least partially within the outer ear, such as from the helix to the ear canal (e.g., the concha cymba, concha cavum) and can extend up to or into the ear canal. In some configurations, the shape of the housing 102 can be customized for the wearer's ear canal (e.g., based on a mold taken from the wearer's ear canal). In other configurations, the housing 102 can be constructed from pliant (e.g., semisoft) material that, when inserted into the wearer's ear canal, takes on the shape of the ear canal.

The housing 102 is configured to contain or support a number of components including a sensor facility 134 comprising one or more sensors 134*a*. The sensor facility

134 can include or be coupled to signal processing circuitry 136 configured to process sensor signals prior to communication of the sensor signals to a controller 120 coupled to a memory 122. The memory 122 is configured to store fit assessment software 123, which includes program instructions executable by the controller 120. As will be described in greater detail hereinbelow, the controller 120 is configured to execute fit assessment program instructions 123 to assess the fit of the device 100 in, on or about the wearer's ear using the sensor signals produced by the sensor facility 134. A power source 144, such as a rechargeable battery (e.g., lithium-ion battery), is configured to provide power to various components of the device 100.

In accordance with any of the embodiments disclosed herein, and after deploying the device 100 in the wearer's ear for example, the wearer performs some basic head motion, such as a head nod or shake (or a sequence of same), as part of a device fit assessment procedure. Instructions for performing the predetermined head motion can be communicated to the wearer, such as audibly if the device 100 is equipped with an audio output device and/or visually via a smartphone or other electronic device communicatively coupled to the ear-worn electronic device 100. During and/or after execution of the wearer's predetermined head motion, the sensor facility 134 actively senses motion of the wearer's head. In addition, one or more sensors 134*a* of the sensor facility 134 actively sense relative motion between the sensor(s) 134*a* and tissue (e.g., skin) of the wearer's ear.

The controller 120 is configured to assess the fit of the device 100 using sensor signals received from the sensor facility 134. The controller 120 can be configured to detect whether the fit of the device 100 is a proper fit or an improper fit using the sensor signals. The controller 120 can generate an output indicative of the device fit assessment (e.g., an output indicating a good fit or a poor fit). For example, the output produced by the controller 120 can include an audible output and/or a tactile output. Although it is preferred to have the wearer perform predetermined head movements during the device fit assessment procedure, assessing the device fit can be performed at any time when movement of the wearer's head is detected by the sensor facility 134.

Figure 10:
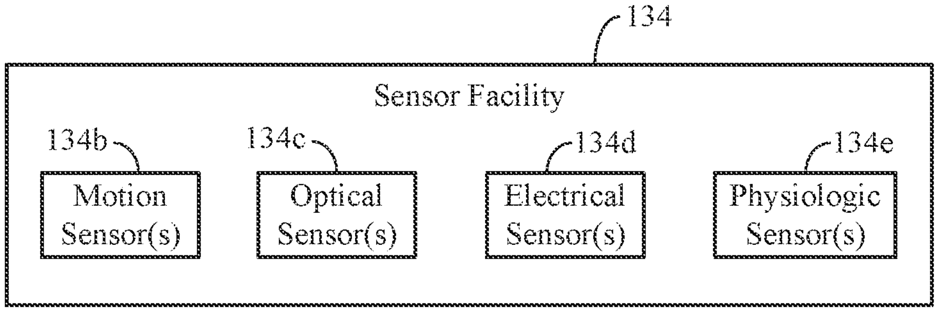
FIG. 10 is a block diagram of a sensor facility of an ear-worn electronic device configured to implement a sensor-based device fit assessment in of accordance with any of the embodiments disclosed herein.

The sensor facility 134 includes one or more sensors 134*a*, representative examples of which are shown in FIG. 10. The sensor facility 134 can include one or more motion sensors 134*b*, one or more optical sensors 134*c*, and one or more electrical sensors 134*d*. The one or more motion sensors 134*b* can include one or more of accelerometers, gyros, and magnetometers. For example, the motion sensor 134*b* can be implemented to include a multi-axis (e.g., 9-axis) sensor, such as an IMU (inertial measurement unit). A suitable IMU is disclosed in commonly owned U.S. Pat. No. 9,848,273, which is incorporated herein by reference. The one or more optical sensors 134*c* can include a photoplethysmography (PPG) sensor, such as a pulse oximeter. The one or more electrical sensors 134*d* can include one or more sensors configured to contact the skin of the wearer's ear and sense a change in an electrical property of the skin. For example, the one or more electrical sensors 134*d* can be configured to sense one or any combination of impedance, conductance, resistance, and electrodermal activity (e.g., galvanic skin response). Signals generated by any one or any combination of the motion sensors 134*b*, optical sensors 134*c*, an electrical sensors 134*d* can be used by the controller 120 to assess the fit of the device 100.

In some implementations, the ear-worn electronic device 100 can be implemented as a physiologic (e.g., biometric) monitoring device. In such implementations, the sensor facility 134 of the device 100 can include one or more physiologic or biometric sensors 134*e*. The physiologic/biometric sensors 134*e* can include one or more of an EKG or ECG sensor, an $SpO_2$ sensor, a respiration sensor, a temperature sensor (e.g., for measuring core body temperature), a glucose sensor, an EEG sensor, an EMG sensor, and an EOG sensor. Representative examples of such sensors are disclosed in US Pat. Pub. Nos. 2018/0014784 (Heeger et al.), 2013/0216434 (Ow-Wing), and 2010/0253505 (Chou), and in U.S. Pat. Nos. 9,445,768 (Alexander et al.) and 9,107,586 (Bao), each of which is incorporated herein by reference in its entirety. As will be discussed hereinbelow, the device 100 can include or exclude a hearing assistance or audio processing/output facility (e.g., see FIG. 13).

The controller 120 can be configured to assess the fit of the device 100 using sensor signals generated by the sensor facility 134 during and/or after execution of the wearer's predetermined head motion. For example, the controller 120 can be configured to detect execution of the wearer's predetermined head motion using a first portion of a sensor signal produced by the sensor facility 134 and, in response, assess the fit of the device using a second portion of the sensor signal representative of relative motion between a sensor 134*a* and skin of the wearer's ear resulting from execution of the wearer's head motion. Detection of the first portion of the sensor signal by the controller 120 can serve as a trigger event for performing the device fit assessment using the second portion of the sensor signal.

The controller 120 can be configured to measure a baseline feature of the sensor signal prior to and after execution of the wearer's predetermined head motion, and assess the fit of the device 100 using a change in the measured baseline feature, such as a rate of change in the measured baseline feature. For example, the controller 120 can assess the fit of the device 100 using a change in magnitude of the measured baseline feature. By way of further example, the controller 120 can assess the fit of the device 100 using a rate of change in the measured baseline feature and a change in magnitude of the measured baseline feature.

According to some implementations, the controller 120 can be configured to detect an artifact in the sensor signal during or following execution of the wearer's predetermined head motion, and assess the fit of the device 100 using the artifact. The controller 120 can be configured to detect the presence or absence of an artifact in the sensor signal during or following execution of the wearer's predetermined head motion, and assess the fit of the device 100 in response to detecting the presence or absence of the artifact. For example, the controller 120 can be configured to detect the presence or absence of an artifact in the sensor signal during or following execution of the wearer's predetermined head motion, detect a proper fit of the device 100 in response to detecting the absence of the artifact, and detect an improper fit of the device 100 in response to detecting the presence of the artifact. In further implementations, the controller 120 can be configured to detect an artifact in the sensor signal during or following execution of the wearer's head motion, measure a feature of the artifact, and assess the fit of the device 100 using the measure of the artifact feature.

Various types of sensor signal artifacts can be detected and processed by the controller 120 when assessing the fit of the device. The artifact in the sensor signal detected and processed by the controller 120 can comprise noise, such as high-frequency noise. Generally, sensor signal noise is an undesirable component which is typically filtered, removed or discarded. Embodiments of the present disclosure advantageously use sensor signal noise as a signal component for assessing the fit of the device 100. For example, the high-frequency noise artifact can have a frequency higher than a frequency associated with any motion of the wearer's head (e.g., a head motion threshold frequency). The controller 120 can detect a poor fit by comparing the frequency of the high-frequency noise artifact to a threshold indicative of a poor fit. The controller 120 can detect a good fit by detecting an absence of the high-frequency noise artifact following a head nod or shake event.

The artifact in the sensor signal detected and processed by the controller 120 can comprise a change in a signal-to-noise ratio (SNR) of the sensor signal. For example, the controller 120 can compare the SNR of the sensor signal prior to and after a head nod or shake event. For example, the SNR of the sensor signal may change from 20 to 5 in response to the head nod or shake event, which is indicative of a poor fit. The controller 120 can determine whether the fit is proper or improper by comparing the difference in the sensor signal SNR prior to and after the head nod or shake event to a threshold.

The sensor signal artifact detected and processed by the controller 120 can comprise ringing in the sensor signal. The controller 120 can detect a poor fit in response to detecting excessive ringing in the sensor signal. Determining whether ringing in the sensor signal is excessive by the controller 120 can be based on a threshold or a pattern in the sensor signal which can vary depending on the material of the ear-worn electronic device and the condition of the ear. For example, a rigid plastic device would behave differently than a device coated in silicon. Also, an ear with more subcutaneous fat would respond differently than an ear with little or no fat and just cartilage. The controller 120 can be configured to detect excessive ringing in the sensor signal in response to recognizing a pattern in the sensor signal specific to the device and its fit condition under different situations.

The sensor signal artifact detected and processed by the controller 120 can comprise a change in morphology (e.g., shape) of the sensor signal. The controller 120 can compute a correlation coefficient based on a comparison of the morphology of the sensor signal and a pre-established template. The controller 120 can detect a poor fit in response to the correlation coefficient falling below a threshold (e.g., <a 97% match) based on a comparison of the sensor signal morphology and the pre-established template.

In accordance with various implementations, the controller 120 can be configured to detect a sensor signal artifact in the form of a shift in a DC baseline level of the sensor signal. The time required for the baseline level of the sensor signal to recover to its original state following a head nod or shake event can be detected by the controller 120 as an indication of a proper fit or an improper fit. For example, recovery of the sensor signal's DC baseline level to its original level within about 2 to 3 seconds for a PPG sensor following a head nod or shake event is indicative of a good fit. In contrast, a bad fit can be detected by the controller 120 as an excessively long duration of time (e.g., >10 to 20 seconds) for the DC baseline level of the sensor signal to recover, if at all. For example, detecting non-recovery of the sensor signals DC baseline level following a head nod or shake event is indicative of a poor fit.

According to another implementation, the sensor facility 134 can include an optical sensor 134*c* implemented as a PPG sensor. The controller 120 can be configured to measure the shift in a perfusion index (PI) measured by the PPG sensor. The controller 120 can be configured to calculate the perfusion index, PI, by dividing the pulsatile signal (AC component) by the non-pulsatile signal (DC component) times 100, and is expressed in percent (PI=(AC/DC)*100). A shift of the perfusion index, PI, beyond a threshold can be detected by the controller 120 as indicative of a poor fit. For example, a sudden change of 5% PI over a few seconds (e.g., 1 to 3 seconds) can be indicative of device displacement and a poor fit.

Figure 11:
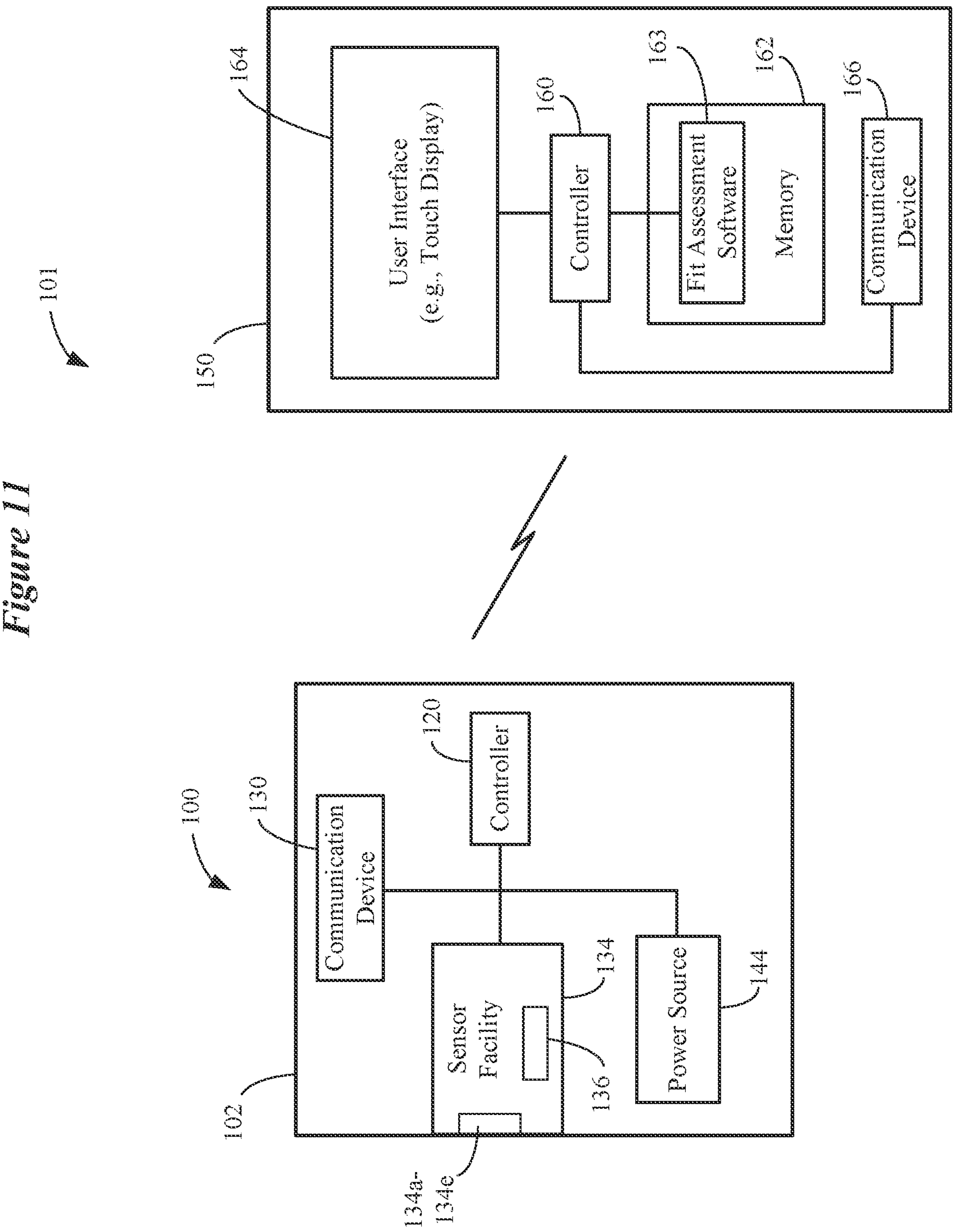
FIG. 11 illustrates a system configured to implement a sensor-based device fit assessment in accordance with any of the embodiments disclosed herein, the system comprising an ear-worn electronic device and an external electronic device configured to communicatively couple to the ear-worn electronic device.

FIG. 11 illustrates a system 101 in accordance with any of the embodiments disclosed herein. The system 101 comprises an ear-worn electronic device 100 and an external electronic device 150 configured to communicatively couple to the ear-worn electronic device 100. The ear-worn electronic device 100 includes a housing 102 configured for deployment in, on or about an ear of a wearer as previously described. The housing 102 is configured to contain or support a number of components including a sensor facility 134 comprising one or more sensors 134*a*-134*e* as previously described. The sensor facility 134 can include or be coupled to signal processing circuitry 136 configured to process sensor signals prior to communication of the sensor signals to a controller 120 coupled to a memory 122. The controller 120 is configured to control operation of the various components of the device 100 and is coupled to a communication device 130.

The communication device 130 can include a radiofrequency (RF) transceiver and antenna and/or a near field magnetic induction (NFMI) transceiver and antenna. For example, the communication device 130 can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4. 2, 5.0, 5.1, 5.2 or later) specification, for example. Sensor signals generated by the sensor facility 134 can be communicated to the external electronic device 150 via the communication device 130.

The external electronic device 150 includes a communication device 166 configured to communicatively coupled to the communication device 130 of the ear-worn electronic device 100. The external electronic device 150 includes a controller 160 coupled to memory 162 and a user interface 164. The user interface 164 can include a touch display and an audio processing facility (e.g., a speaker and optionally a microphone), for example. The memory 162 is configured to store fit assessment software 163, which includes program instructions executable by the controller 160. As described hereinabove, the controller 160 of the external electronic device 150 is configured to assess the fit of the device 100 in, on or about the wearer's ear using sensor signals produced by the sensor facility 134 of the ear-worn electronic device 100. The controller 160 can generate an output indicative of the device fit assessment (e.g., an output indicating a good fit or a poor fit). The output produced by the controller 160 can include an audible output, a visual output, a tactile output, or combination of any of these outputs.

Figure 12:
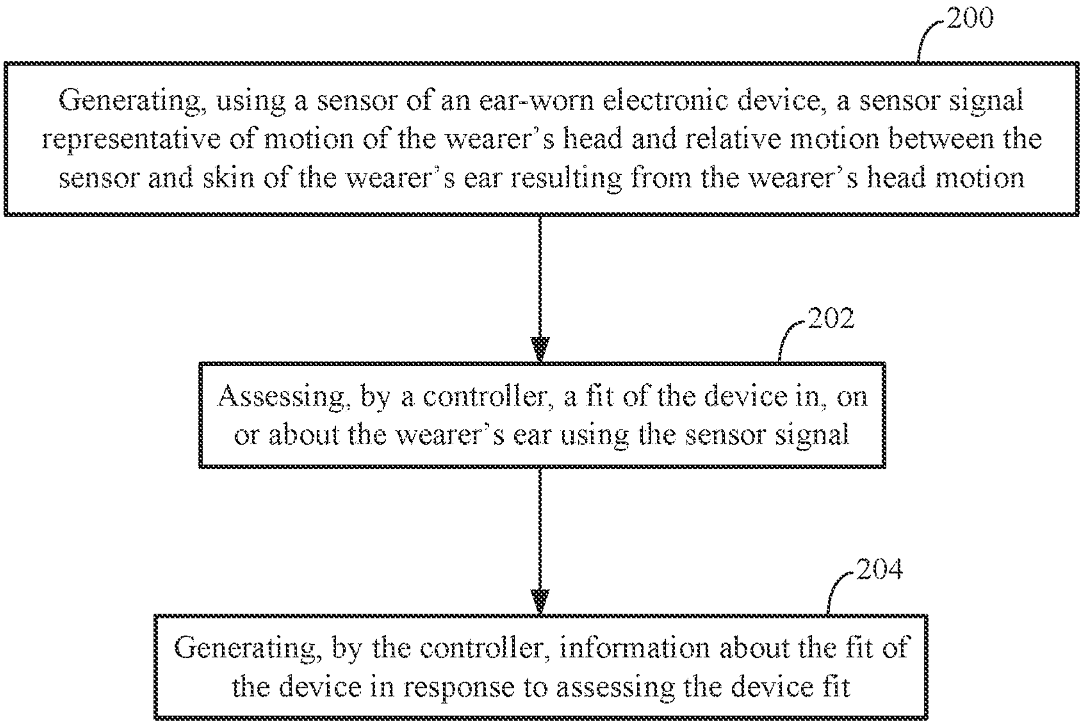
FIG. 12 is a flow diagram of a method for assessing the fit of an ear-worn electronic device in a wearer's ear in accordance with any of the embodiments disclosed herein.

FIG. 12 is a flow diagram of a method for assessing the fit of an ear-worn electronic device in a wearer's ear in accordance with any of the embodiments disclosed herein. For example, the method shown in FIG. 12 can be implemented by any of the devices shown in FIGS. 9-11. The method shown in FIG. 12 involves generating 200, using at least one sensor of an ear-worn electronic device, a sensor signal representative of motion of the wearer's head and relative motion between the sensor and skin of the wearer's ear resulting from the wearer's head motion. The method also involves assessing 202, by a controller, a fit of the device in, on or about the wearer's ear using the sensor signal. Assessing fit of the device can be implemented by a controller of the ear-worn electronic device, a controller of an external electronic device, or via cooperation between controllers of the ear-worn electronic device and the external electronic device. The method further involves generating 204, by the controller, information about the fit of the device in response to assessing the device fit. As was previously described, the information generated by the controller can include an audible output, a visual output, a tactile output, or a combination of any of these outputs.

Figure 13:
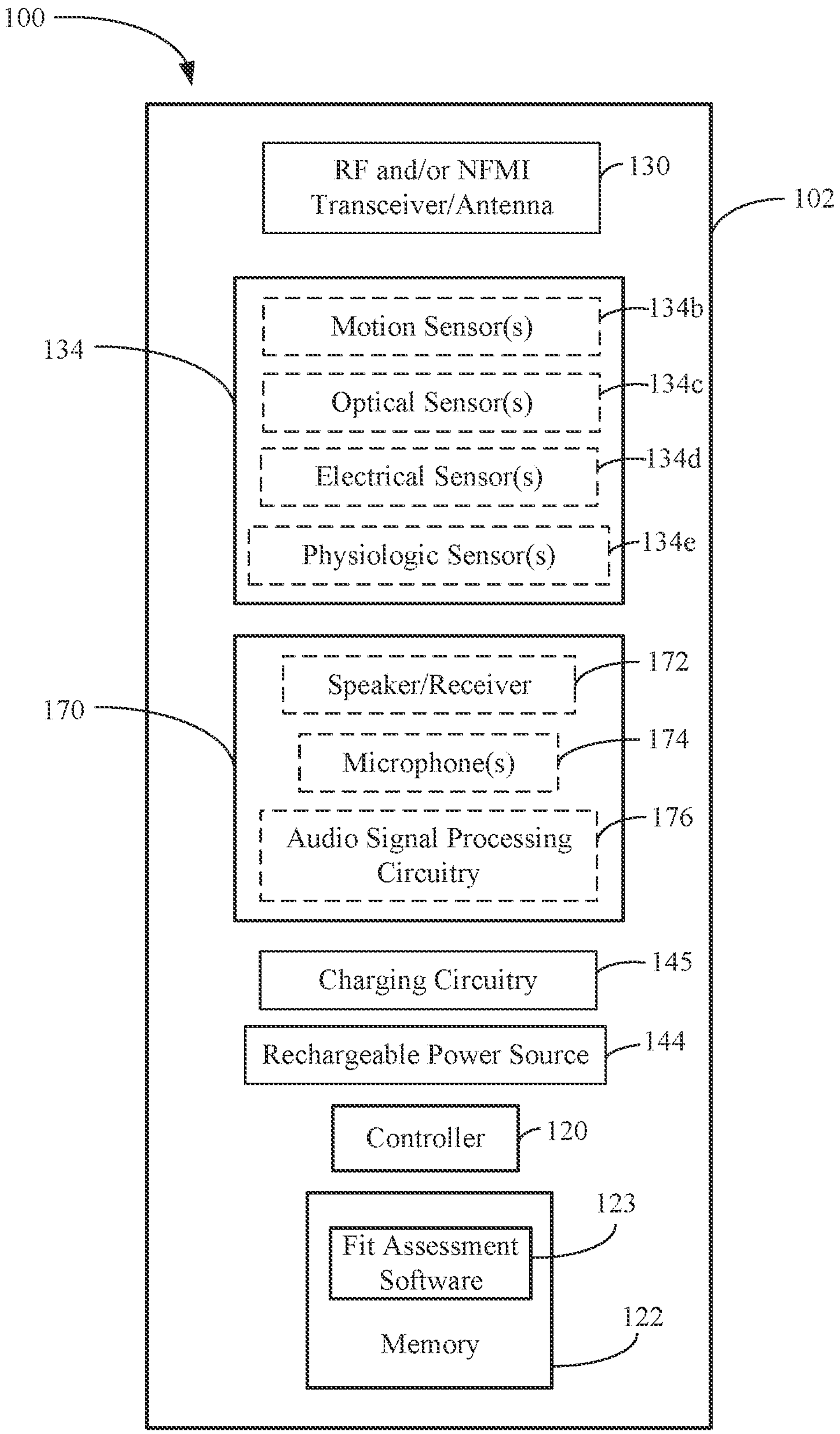
FIG. 13 is a block diagram of an ear-worn electronic device configured to implement a sensor-based device fit assessment in of accordance with any of the embodiments disclosed herein.

FIG. 13 is a block diagram of an ear-worn electronic device 100 configured to implement a sensor-based device fit assessment in of accordance with any of the embodiments disclosed herein. As was previously discussed, the device 100 is representative of a wide variety of electronic devices configured to be deployed in, on or about an ear of a wearer. The device 100 shown in FIG. 13 includes the core components shown in FIG. 9, including a controller 120 coupled to memory 122 configured to store fit assessment software 123, a sensor facility 134, and a power source 144. In implementations that include a rechargeable power source 144, the device 100 includes charging circuitry 145 coupled to the rechargeable power source 144. The charging circuitry 145 is configured to cooperate with an external charging module to facilitate charging of the rechargeable power source 144. As was previously discussed, the sensor facility 134 can include any one or any combination of one or more motion sensors 134*b*, one or more optical sensors 134*c*, one or more electrical sensors 134*d*, and one or more physiologic sensors 134*e*.

In some embodiments, the device 100 incorporates an audio processing facility 170. The audio processing facility 170 includes audio signal processing circuitry 176 coupled to a speaker or receiver 172. The audio processing facility 170 may also include one or more microphones 174 coupled to the audio signal processing circuitry 176. In other embodiments, the device 100 is devoid of the audio processing facility 170. The device 100 can also incorporate a communication facility 130 configured to effect communications with an external electronic device, system and/or the cloud. The communication facility 130 can include one or both of an RF transceiver/antenna and/or an NFMI transceiver/antenna.

According to embodiments that incorporate the audio processing facility 170, the device 100 can be implemented as a hearing assistance device that can aid a person with impaired hearing. For example, the device 100 can be implemented as a monaural hearing aid or a pair of devices 100 can be implemented as a binaural hearing aid system. The monaural device 100 or a pair of devices 100 can be configured to effect bi-directional communication (e.g., wireless communication) of data with an external source, such as a remote server via the Internet or other communication infrastructure. The device or devices 100 can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a radio, a smartphone, a laptop, a cell phone/entertainment device (CPED) or other electronic device that serves as a source of digital audio data, control and/or settings data or commands, and/or other types of data files.

The controller 120 (and the controller 160 shown in FIG. 12) can include one or more processors or other logic devices. For example, the controller 120, 160 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 120, 160 can incorporate or be coupled to various analog components (e.g., analog front-end), ADC and DAC components, and Filters (e.g., FIR filter, Kalman filter). The memory 122 can include one or more types of memory, including ROM, RAM, SDRAM, NVRAM, EEPROM, and FLASH, for example. The memory 122 can be coupled to, or incorporated in, the controller 120, 160.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words “preferred” and “preferably” refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms “a,” “an,” and “the” encompass embodiments having plural referents, unless the content clearly dictates otherwise. As used in this specification and the appended claims, the term “or” is generally employed in its sense including “and/or” unless the content clearly dictates otherwise.

As used herein, “have,” “having,” “include,” “including,” “comprise,” “comprising” or the like are used in their open-ended sense, and generally mean “including, but not limited to.” It will be understood that “consisting essentially of,” “consisting of,” and the like are subsumed in “comprising,” and the like. The term “and/or” means one or all of the listed elements or a combination of at least two of the listed elements.

The phrases “at least one of,” “comprises at least one of,” and “one or more of” followed by a list refers to any one of the items in the list and any combination of two or more items in the list.

What is claimed is:

1. An ear-worn electronic device, comprising:
- a housing configured for deployment in, on or about an ear of a wearer;
- a power source situated in the housing;
- a sensor situated in or on the housing and coupled to the power source, the sensor configured to generate a sensor signal representative of motion of the wearer’s head and relative motion between the sensor and skin of the wearer’s ear resulting from the wearer’s head motion; and
- a controller situated in the housing and coupled to the power source and the sensor, the controller configured to assess a fit of the device using the sensor signal and produce an output indicating a proper fit or an improper fit based on the fit assessment.

2. The device according to claim 1, wherein the controller is configured to:
- detect execution of the wearer’s head motion using a first portion of the sensor signal; and
- assess the fit of the device using a second portion of the sensor signal representative of relative motion between the sensor and skin of the wearer’s ear resulting from execution of the wearer’s head motion.

3. The device according to claim 1, wherein the controller is configured to assess the fit of the device using the sensor signal generated:
- after execution of the wearer’s head motion; or
- during and after execution of the wearer’s head motion.

4. The device according to claim 1, wherein the controller is configured to:
- detect an artifact in the sensor signal during and/or following execution of the wearer’s head motion; and
- assess the fit of the device using the artifact.

5. The device according to claim 4, wherein the artifact comprises noise.

6. The device according to claim 4, wherein:
- the artifact comprises high frequency noise; and
- a frequency of the high frequency noise is higher than a frequency associated with any motion of the wearer’s head.

7. The device according to claim 4, wherein the artifact comprises at least one of:
- ringing in the sensor signal;
- a change in morphology of the sensor signal;
- a shift in a baseline measurement of the sensor signal; and
- a change in a signal-to-noise ratio (SNR) of the sensor signal.

8. The device according to claim 4, wherein the artifact comprises a shift in a DC baseline level of the sensor signal.

9. The device according to claim 1, wherein the controller is configured to:
- detect the presence or absence of an artifact in the sensor signal during and/or following execution of the wearer’s head motion;
- detect a proper fit of the device in response to detecting the absence of the artifact; and
- detect an improper fit of the device in response to detecting the presence of the artifact.

10. The device according to claim 1, wherein the controller is configured to:
- measure a baseline feature of the sensor signal prior to and after execution of the wearer’s head motion; and
- assess the fit of the device using at least one of:
  - a change in the measured baseline feature;
  - a rate of change in the measured baseline feature;
  - a change in magnitude of the measured baseline feature; and
  - a rate of change in the measured baseline feature and a change in magnitude of the measured baseline feature.

11. The device according to claim 1, wherein the sensor comprises one or any combination of:
- an accelerometer;
- a gyroscope;
- a magnetometer;
- an inertial measurement;
- a photoplethysmogram (PPG) sensor; and
- a sensor configured to contact the skin of the wearer’s ear and sense one or any combination of impedance, conductance, resistance, and electrodermal activity.

12. The device according to claim 1, wherein the sensor comprises a photoplethysmogram (PPG) sensor and the controller is configured to:
- calculate a perfusion index (PI) measured by the PPG sensor;
- measure a shift of the PI prior to and after execution of the wearer’s head motion; and
- assess the fit of the device using the measured shift of the PI.

13. The device according to claim 1, wherein the controller is configured to generate an output indicating a result of the fit assessment, and the output comprises at least one of:
- an audible output communicated to an ear drum of the wearer’s ear; and
- a signal transmitted from a wireless communication device of the ear-worn electronic device to an external device or system.

14. A method implemented by an ear-worn electronic device configured for deployment in, on or about an ear of a wearer, the method comprising:

generating, using a sensor of the device, a sensor signal representative of motion of the wearer's head and relative motion between the sensor and skin of the wearer's ear resulting from the wearer's head motion;

assessing, by a controller, a fit of the device using the sensor signal; and generating, by the controller, information about the fit of the device in response to assessing the device fit; and producing, by the controller, an output indicating a proper fit or an improper fit of the device based on the generated information.

15. The method according to claim 14, wherein the controller comprises a controller of the ear-worn electronic device or a controller of an external electronic device configured to communicatively couple to the ear-worn electronic device.

16. The method according to claim 14, comprising:

detecting execution of the wearer's head motion using a first portion of the sensor signal; and assessing the fit of the device using a second portion of the sensor signal representative of relative motion between the sensor and skin of the wearer's ear resulting from execution of the wearer's head motion.

17. The method according to claim 14, comprising:

detecting an artifact in the sensor signal during and/or following execution of the wearer's head motion; and assessing the fit of the device using the artifact.

18. The method according to claim 14, wherein:

the artifact comprises high frequency noise; and a frequency of the high frequency noise is higher than a frequency associated with any motion of the wearer's head.

19. The method according to claim 14, wherein the artifact comprises at least one of:

ringing in the sensor signal;

a change in morphology of the sensor signal;

a shift in a baseline measurement of the sensor signal; and a change in a signal-to-noise ratio (SNR) of the sensor signal.

20. The method according to claim 14, comprising:

detecting the presence or absence of an artifact in the sensor signal during and/or following execution of the wearer's head motion;

detecting a proper fit of the device in response to detecting the absence of the artifact; and detecting an improper fit of the device in response to detecting the presence of the artifact.

* * * * *